United States Patent [19]

Inokuchi et al.

[11] Patent Number: 5,760,109
[45] Date of Patent: Jun. 2, 1998

[54] WATER-BASE ORGANOPOLYSILOXANE COMPOSITION

[75] Inventors: Yoshinori Inokuchi; Satoshi Kuwata, both of Gunma-ken, Japan

[73] Assignee: Shin-Etsu Chemical, Co., Ltd., Japan

[21] Appl. No.: 694,352

[22] Filed: Aug. 8, 1996

[30] Foreign Application Priority Data

Aug. 9, 1995 [JP] Japan .................................. 7-203122

[51] Int. Cl.$^6$ ...................................................... C08K 3/20
[52] U.S. Cl. ........................... 523/414; 523/420; 523/425; 523/435; 525/476; 528/28; 428/447
[58] Field of Search ...................... 523/414, 420, 523/425, 435; 528/28; 525/476; 428/447

[56] References Cited

U.S. PATENT DOCUMENTS

| | | | |
|---|---|---|---|
| 4,981,728 | 1/1991 | Homma et al. | 427/386 |
| 5,102,960 | 4/1992 | Imai et al. | 525/476 |
| 5,527,841 | 6/1996 | Inokuchi et al. | 523/435 |

FOREIGN PATENT DOCUMENTS 653472  11/1994  European Pat. Off. .

*Primary Examiner*—Margaret W. Glass
*Attorney, Agent, or Firm*—Millen, White, Zelano & Branigan, P.C.

[57] ABSTRACT

Proposed is a novel organopolysiloxane composition in the form of a water-base emulsion suitable for use as a surface-coating agent on rubber articles such as automobile parts to impart excellent smoothness of the surface, abrasion resistance, adhesion to the rubber surface and so on. The composition comprises: (a) an organopolysiloxane having a viscosity of at least 10000 centipoise at 25° C. and having a molecular structure consisting of the difunctional siloxane units and the trifunctional siloxane units terminated at each molecular chain end with a hydroxy group, in the form of an aqueous emulsion; (b) a hydrolysis-condensation product of an epoxy group-containing dialkoxy silane in the form of an aqueous emulsion; (c) a water-soluble organic amino compound having at least two amino groups in a molecule and containing no silicon atom; and (d) silicone rubber particles in the form of an aqueous dispersion, each in a specified weight proportion.

16 Claims, 2 Drawing Sheets

WATER-BASE ORGANOPOLYSILOXANE COMPOSITION

BACKGROUND OF THE INVENTION

The present invention relates to a novel water-base organopolysiloxane composition or, more particularly, to a water-base organopolysiloxane composition suitable as a surface coating agent on various kinds of rubber articles such as weather strips, sealing rubber members, rubber hoses and the like in automobiles capable of giving a coating film having excellent adhesion to the substrate surface, abrasion resistance and smoothness of the surface.

It is conventional that the surface of various kinds of rubber articles is subjected to a surface treatment with an organopolysiloxane resin-based composition in an object to impart the surface of the rubber article with abrasion resistance. For example, Japanese Patent Publication 60-50226 proposes a method for the surface treatment of a rubber article with a composition comprising an epoxy group-containing organopolysiloxane and an amino group-containing organosilane compound and/or organosiloxane compound. Further, Japanese Patent Publications 54-43023 and 56-47864 disclose a method for the surface treatment of a rubber article with a composition comprising a hydroxy group-containing organopolysiloxane and an organohydrogenpolysiloxane.

These prior art methods, however, are not always quite satisfactory because the coating layer formed from the organopolysiloxane composition is sometimes poor in the adhesion to the substrate surface, abrasion resistance and surface smoothness. In addition, these organopolysiloxane compositions have a problem in respect of the environmental pollution and safety because they are used usually in the form of a solution in an organic solvent. In view of the above described problems, the inventors have conducted extensive investigations to develop an improved organopolysiloxane composition for coating of the surfaces of a rubber article leading to completion of the present invention.

SUMMARY OF THE INVENTION

The present invention accordingly has an object to provide an organopolysiloxane composition suitable for use as a coating agent on the surface of a rubber article and capable of giving a coating film having excellent adhesion to the substrate surface, abrasion resistance and smoothness of the surface without the problem of environmental pollution due to organic solvents.

Thus, the present invention provides an organopolysiloxane composition which is in the form of a water-base emulsion suitable as a coating agent on the surface of a rubber article and which composition comprises:

(a) an organopolysiloxane having a viscosity of at least 10000 centipoise at 25° C. and having a molecular structure consisting of difunctional siloxane units represented by the general unit formula $R^1_2SiO_{2/2}$ and trifunctional siloxane units represented by the general unit formula $R^2SiO_{3/2}$, in which $R^1$ and $R^2$ are each an unsubstituted or substituted monovalent hydrocarbon group having 1 to 20 carbon atoms, in a molar proportion of the trifunctional units to the difunctional units not exceeding 0.01, and terminated at each molecular chain end with a hydroxy group, which organopolysiloxane is in the form of an aqueous emulsion;

(b) a hydrolysis-condensation product of an epoxy group-containing dialkoxy silane compound represented by the general formula $R^3SiR^4(OR^5)_2$, in which $R^3$ is an epoxy group-containing monovalent organic group having 5 to 20 carbon atoms and $R^4$ and $R^5$ are each a monovalent hydrocarbon group having 1 to 6 carbon atoms and free from an epoxy group, a cohydrolysis-cocondensation product of the above defined epoxy group-containing dialkoxy silane compound and a dialkoxy silane compound free from an epoxy group represented by the general formula $R^6R^7Si(OR^8)_2$, in which $R^6$, $R^7$ and $R^8$ are each a monovalent hydrocarbon group having 1 to 6 carbon atoms free from an epoxy group, or a combination thereof, which is in the form of an aqueous emulsion;

(c) a water-soluble organic amino compound having at least two amino groups in a molecule and containing no silicon atom; and (d) silicone rubber particles in the form of an aqueous dispersion, in such a weight proportion that the amounts of the components (a), (b), (c) and (d) are in the ranges from 10 to 90% by weight, from 1 to 50% by weight, from 0.1 to 40% by weight and from 1 to 70% by weight, respectively, based on the total amount of the components (a), (b), (c) and (d).

DETAILED DESCRIPTION OF THE PREFERRED EMBODIMENTS

Figure 1:
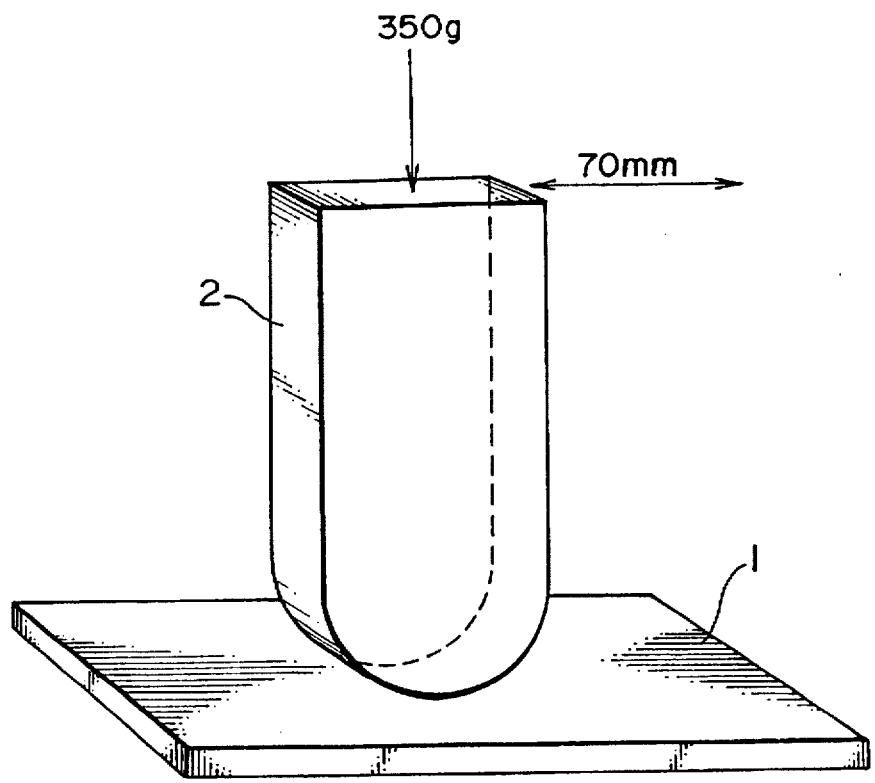
FIG. 1 is a schematic perspective illustration of the method for the determination of the abrasion resistance of the coating film.

As is defined above, the water-base organopolysiloxane composition of the invention comprises, as the essential ingredients, four components (a), (b), (c) and (d), of which the components (a), (b) and (c) are each in the form of an aqueous emulsion or dispersion while the component (c) is a water-soluble compound. In the following, each of these components is described in more detail.

The component (a) is an organopolysiloxane compound having a viscosity of at least 10000 centipoise at 25° C. and having a molecular structure consisting of the difunctional siloxane units of the general unit formula $R^1_2SiO_{2/2}$ and trifunctional siloxane units of the general unit formula $R^2SiO_{3/2}$ in a molar proportion of the trifunctional to difunctional siloxane units not exceeding 0.01, and terminated at each molecular chain end with a hydroxy group, which organopolysiloxane is in the form of an aqueous emulsion.

In the above mentioned unit formulas representing the two types of the siloxane units, $R^1$ and $R^2$ are each an unsubstituted or substituted monovalent hydrocarbon group having 1 to 20 carbon atoms. Examples of the hydrocarbon group include alkyl groups such as methyl, ethyl, propyl, butyl, pentyl, hexyl, heptyl, octyl, nonyl, dodecyl, tetradecyl, hexadecyl and octadecyl groups, alkenyl groups such as vinyl and allyl groups, aryl groups such as phenyl and tolyl groups and cycloalkyl groups such as cyclohexyl group as well as those substituted monovalent hydrocarbon groups obtained by replacing a part or all of the hydrogen atoms in the above named hydrocarbon groups with halogen atoms or organic groups having an epoxy group, carboxyl group, amino group and the like. It is preferable that at least 90% in number of the groups denoted by $R^1$ are methyl groups. It is also preferable that the groups denoted by $R^2$ are selected from methyl and phenyl groups.

The above defined organopolysiloxane compound terminated by hydroxy groups at the molecular chain ends can be obtained in the form of an aqueous emulsion by the method of emulsion polymerization according to a known procedure. Namely, the difunctional organosiloxane units of the general formula $R^1{}_2SiO_{2/2}$ can be derived from a cyclic organopolysiloxane oligomer of the general formula $(R^1{}_2SiO)_A$, in which the subscript A is a positive integer of 3 to 7 or an organosilane compound or a linear organopolysiloxane compound of the general formula $R^{10}O(R^1{}_2SiO)_BR^{10}$ or $HO(R^1{}_2SiO)_BH$, in which $R^{10}$ is a monovalent hydrocarbon group having 1 to 6 carbon atoms or a halogenated hydrocarbon group exemplified by alkyl groups such as methyl, ethyl, propyl, butyl and hexyl groups, cycloalkyl groups such as cyclopentyl and cyclohexyl groups, phenyl group and halogenated alkyl groups such as trifluoropropyl group, of which methyl and ethyl groups are preferable, and the subscript B is a positive integer of 1 to 1000, as the starting material and the organosiloxane units represented by the general unit formula $R^2SiO_{3/2}$ can be derived from an alkoxy silane compound represented by the general formula $R^2Si(OR^{10})_3$ as the starting material. These organosilicon compounds as the starting materials are dispersed and emulsified in water by using an emulsifying agent and subjected to the polymerization reaction with addition of a catalyst to the emulsion followed by inactivation of the catalyst after completion of the polymerization reaction to give the desired hydroxy-terminated organopolysiloxane as the component (a) in the form of an aqueous emulsion.

Various kinds of surface active agents can be used as the emulsifying agent in the above mentioned emulsion polymerization including cationic surface active agents such as quaternary ammonium salts, salts of alkyl amines and the like, amphoteric surface active agents such as alkyl betaines and the like, non-ionic surface active agents such as polyoxyethylene alkyl ethers, polyoxyethylene alkylphenyl ethers, sorbitan fatty acid esters, glycerin fatty acid esters and the like and acidic anionic surface active agents such as organic sulfonic acids, esters of alkyl sulfates and the like. These surface active agents can be used either singly or as a combination of two kinds or more, if compatible.

While an acidic anionic surface active agent such as organic sulfonic acids and esters of alkyl sulfates per se used as the emulsifying agent exhibits an activity as a polymerization catalyst, it is necessary that a separate polymerization catalyst is used when a cationic, amphoteric or non-ionic surface active agent is used as the emulsifying agent. Examples of suitable polymerization catalysts include alkaline compounds such as potassium hydroxide, sodium hydroxide, lithium hydroxide, sodium methylate, ammonia, tetramethylammonium hydroxide, triethyl amine, triethanol amine and the like.

The inactivation treatment of the polymerization catalyst after completion of the polymerization reaction can be performed, when the catalyst is an alkaline compound, by neutralizing the catalyst with an acid such as acetic acid, phosphoric acid, hydrochloric acid, citric acid and the like. When an acidic anionic surface active agent is utilized as the polymerization catalyst, the catalytic activity thereof can be destroyed by neutralization with an alkaline compound such as potassium hydroxide, sodium hydroxide, lithium hydroxide, sodium methylate, ammonia, tetramethylammonium hydroxide, triethyl amine, triethanol amine and the like.

As is mentioned above, the hydroxy-terminated organopolysiloxane as the component (a) consists of the difunctional siloxane units and the trifunctional siloxane units. It is essential here that the molar proportion of the trifunctional siloxane units to the difunctional siloxane units does not exceed 0.01 or, preferably, does not exceed 0.005. When the molar proportion of the trifunctional siloxane units is too large, the coating layer formed from the composition would have low surface smoothness so that the abrasion resistance of the coating film is decreased. This molar proportion can be readily controlled by appropriately selecting the blending proportion of the starting organosilicon compounds in the blend of the starting materials to be subjected to the emulsion polymerization.

It is essential that the hydroxy-terminated organopolysiloxane compound as the component (a) has a viscosity of at least 10000 centipoise or, preferably, at least 100000 centipoise at 25° C. When the viscosity thereof is too low, a decrease is caused in the curability of the coating film on the surface of a rubber article.

The hydroxy-terminated organopolysiloxane compound as the component (a) is used in the form of an aqueous emulsion as prepared by the emulsion polymerization, if necessary, after adjustment of the content of the organopolysiloxane with addition of water. The content of the organopolysiloxane as the effective ingredient in the aqueous emulsion is preferably in the range from 1 to 70% by weight. When the content of the effective ingredient in the aqueous emulsion is too low, an economical disadvantage is caused due to the necessary increase in the volume of the aqueous emulsion in the formulation of the inventive composition. When the content of the effective ingredient is too high, difficulties are encountered in the blending works of the components in the preparation of the inventive composition due to the unduly high viscosity of the aqueous emulsion.

The component (b) comprised in the water-base organopolysiloxane composition of the invention is a hydrolysis-condensation product of an epoxy group-containing dialkoxy silane compound represented by the general formula $R^3SiR^4(OR^5)_2$ or a cohydrolysis-cocondensation product of the above defined epoxy group-containing dialkoxy silane compound and another dialkoxy silane compound free from an epoxy group as represented by the general formula $R^6R^7Si(OR^8)_2$, which is in the form of an aqueous emulsion.

The symbol $R^3$ in the above given general formula denotes an epoxy group-containing monovalent organic group having 5 to 20 carbon atoms such as 2-glycidyloxyethyl, 3-glycidyloxypropyl, 2-(3,4-epoxycyclohexyl)ethyl and 3-(3,4-epoxycyclohexyl)propyl groups. $R^4$, $R^5$, $R^6$, $R^7$ and $R^8$ each denote an unsubstituted or halogen-substituted monovalent hydrocarbon group having 1 to 6 carbon atoms including alkyl groups such as methyl, ethyl, propyl, butyl and hexyl groups, cycloalkyl groups such as cyclopentyl and cyclohexyl groups, phenyl group and 3,3,3-trifluoropropyl group, of which methyl and ethyl groups are preferred.

Examples of the above defined epoxy group-containing dialkoxy silane compound include 2-glycidyloxyethyl methyl dimethoxy silane, 2-glycidyloxyethyl methyl diethoxy silane, 3-glycidyloxypropyl methyl dimethoxy silane, 3-glycidyloxypropyl methyl diethoxy silane, 2-(3,4-epoxycyclohexyl)ethyl methyl dimethoxy silane and 2-(3,4-epoxycyclohexyl)ethyl methyl diethoxy silane as the typical ones. The hydrolysis-condensation reaction of these dialkoxy silane compounds readily proceeds by merely admixing the silane compound with an acidic aqueous solution so that a hydrolysis-condensation product can be obtained by the dealcoholation condensation reaction of the alkoxy silane compound to produce an alcohol as the by-product of the reaction, which can be removed by distillation. It is optional that the alkoxy groups or hydroxy groups remaining in the hydrolysis-condensation product can be converted into trimethyl silyl groups by a conventional method for the trimethyl silylation.

When the component (b) is a cohydrolysis-cocondensation product of the above defined epoxy group-containing dialkoxy silane compound and another dialkoxy silane compound free from an epoxy group, the latter dialkoxy silane compound can be selected, for example, from dimethyl dimethoxy silane, dimethyl diethoxy silane, diethyl dimethoxy silane, diethyl diethoxy silane and the like. The procedure of the cohydrolysis-cocondensation reaction is substantially the same as in the hydrolysis-condensation reaction of the epoxy group-containing dialkoxy silane compound alone for a mixture of the two types of the dialkoxy silane compounds, of which the amount of the epoxy group-containing dialkoxy silane compound is preferably at least 50% by moles.

The (co)hydrolysis-(co)condensation product of the dialkoxy silane compound or compounds can be readily emulsified in water by using a surface active agent as an emulsifying agent to give an aqueous emulsion thereof. The surface active agent used here is preferably a non-ionic surface active agent such as polyoxyethylene alkyl ethers, polyoxyethylene alkylphenyl ethers, sorbitan fatty acid esters, glycerin fatty acid esters and the like either singly or as a combination of two kinds or more according to need. The content of the (co)hydrolysis-(co)condensation product as the effective ingredient in the aqueous emulsion is in the range from 1 to 70% by weight or, preferably, from 10 to 50% by weight. When the content of the effective ingredient is too low, an economical disadvantage is caused because the volume of the aqueous emulsion of the component (b) must be so large in the formulation of the inventive composition. When the content thereof is too high, difficulties are encountered in the blending work of the components in the preparation of the inventive composition due to the unduly high viscosity of the aqueous emulsion.

The component (c) comprised in the inventive organopolysiloxane composition is a water-soluble organic amino compound free from a silicon atom and having at least two amino groups in a molecule. Examples of suitable organic amino compounds include ethylenediamine, hexanediamine, diethylenetriamine, triethylenetetramine, 1,8-diamino-4-menthane, N-aminoethyl piperazine, hexamethylene tetramine, 1,3-phenylene diamine, norbornane diamine and the like.

The component (d) comprised in the inventive organopolysiloxane composition is a fine powder of a cured silicone rubber which is in the form of an aqueous dispersion. The particles of the silicone rubber as the component (d) have an average particle diameter in the range from 0.1 to 100 μm or, preferably, from 1 to 20 μm. When the silicone rubber particles are too fine, the behavior of slipperiness of the coating film formed from the composition on the surface of a rubber article would be poor while, when the silicone rubber particles are too coarse, the abrasion resistance of the coating film would be decreased. Although the aqueous dispersion of silicone rubber particles can be prepared by dispersing separately prepared silicone rubber particles in an aqueous medium containing a surface active agent, it is preferable to prepare an aqueous dispersion of silicone rubber particles by dispersing a curable organopolysiloxane as a precursor of a cured silicone rubber in an aqueous medium containing a surface active agent followed by in situ curing of the particles as the dispersant of the dispersion to give an aqueous dispersion of cured silicone rubber particles.

The type of the curing reaction taking place in the particles of the curable organopolysiloxane is not particularly limitative and can be any of the addition reaction by hydrosilation, condensation reaction and ultraviolet-induced reaction provided that the particles are converted into a rubbery elastomer by the curing reaction without particular limitations on the types of the organic groups bonded to the silicon atoms, molecular structure, molecular weight and so on.

When the curing reaction proceeds by the hydrosilation reaction, the particles of the curable organopolysiloxane composition in an aqueous dispersion can be obtained by dispersing an organopolysiloxane having at least two alkenyl, e.g., vinyl, groups bonded to the silicon atoms in a molecule and an organohydrogenpolysiloxane having at least two hydrogen atoms directly bonded to the silicon atoms in a molecule in an aqueous medium together with a catalytic amount of a platinum compound as a catalyst for the hydrosilation reaction by using a surface active agent.

The content of the cured silicone rubber particles as the component (d) in an aqueous dispersion is in the range from 1 to 70% by weight or, preferably, from 10 to 50% by weight. When the content thereof is too low, an economical disadvantage is caused because an unduly large volume of the aqueous dispersion must be formulated in the preparation of the organopolysiloxane composition. When the content of the silicone rubber particles in the aqueous dispersion is too high, difficulties are encountered in the blending work for the preparation of the composition due to the unduly increased consistency of the aqueous dispersion. It is optional that the silicone rubber particles contain various kinds of additives such as an oil, silane compound, powder of an organic or inorganic compound and the like which can be incorporated into the particles by conducting the curing reaction of the curable organopolysiloxane composition admixed in advance with such an additive.

The organopolysiloxane composition of the invention is prepared by blending the above described essential components (a), (b), (c) and (d), of which the components (a), (b) and (d) are each in the form of an aqueous emulsion or dispersion, in a specified proportion. Namely, the amount of the hydroxy-terminated organopolysiloxane as the component (a) is in the range from 10 to 90% by weight based on the total amount of the components (a) to (d). When the amount of the component (a) is too small, the coating film formed from the composition on the surface of a rubber article has poor abrasion resistance. When the amount thereof is too large, the coating film has poor adhesion to the surface of the rubber article so that the abrasion resistance thereof is also decreased.

The amount of the component (b) is in the range from 1 to 50% by weight based on the total amount of the components (a) to (d). When the amount of the component (b) is too small, a decrease is caused in the curability of the coating film on the surface of a rubber article along with a decrease in the adhesion of the cured coating film to the surface of the substrate. When the amount thereof is too large, the coating film of the composition has low abrasion resistance.

The amount of the component (c) in the inventive composition is in the range from 0.1 to 40% by weight based on the total amount of the components (a) to (d). When the amount of the component (c) is too small, a decrease is caused in the curability of the coating film of the composition along with a decrease in the adhesion of the coating film of the composition to the surface of the rubber article as the substrate. When the amount thereof is too large, the coating film of the composition has low abrasion resistance.

The amount of the component (d) in the inventive composition is in the range from 1 to 70% by weight based on the total amount of the components (a) to (d). When the amount of the component (d) is too small, a decrease is caused in the surface smoothness of the coating film of the composition. When the amount thereof is too large, the coating film of the composition has low abrasion resistance.

Preferably, the amounts of the components (a), (b), (c) and (d) based on the total amount of the components (a) to (d) are in the ranges of: from 20 to 70% by weight, from 2 to 30% by weight, from 0.5 to 20% by weight and from 10 to 60% by weight, respectively.

The blending work of these essential ingredients can be performed by using a conventional mixing machine equipped with a stirrer having mixing blades of the paddle type, anchor type and the like. The total content of the components (a) to (d) in the thus obtained water-base composition is in the range from 1 to 50% by weight or, preferably, from 10 to 30% by weight. When the content is too low, the thickness of the coating film on the surface of a rubber article formed by coating with the water-base composition cannot be large enough so that the abrasion resistance of the coating film is low. When the content thereof is too high, a decrease is caused in the stability of the water-base composition in the form of an emulsion or dispersion. When the total content of the essential components is too high, it is advisable to ensure storage stability of the composition by diluting the water-base composition with addition of an additional portion of water so as to bring the content therein not to exceed the upper limit.

While the water-base organopolysiloxane composition of the invention comprising the above described components (a) to (d) is useful as a surface coating agent on a rubber article to give a cured coating film exhibiting excellent adhesion to the substrate surface and having excellent smoothness of the surface, the rubbery material from which the rubber article is made includes natural rubber, EPDM rubbers, styrene-butadiene copolymeric rubbers, polychloroprene rubbers, isoprene-isobutylene copolymeric rubbers, nitrile rubbers and the like. The rubbery material forming the rubber article can be a porous or spongy foamed rubber or can be a non-porous solid rubber.

The method for coating the surface of a rubber article with the inventive water-base organopolysiloxane composition is not particularly limitative including brush coating, spray coating, roller coating, dip coating, knife coating and the like and the thus formed coating film can be cured by drying at room temperature or under heating. The thickness of the thus obtained cured coating film of the inventive composition should be in the range from 0.1 to 10 µm or, preferably, in the range from 0.5 to 5 µm in order to have appropriate abrasion resistance. The rubber article coated in this way is imparted with excellent abrasion resistance and smoothness of the surface so that various kinds of rubber articles including rubber-made sealing members such as weather strips in automobiles, O-rings, gaskets and packings, rubber hoses and the like can be upgraded by coating with the inventive water-base organopolysiloxane composition.

It is of course optional that the inventive water-base organopolysiloxane composition is admixed, in order to promote curing of the coating film of the composition, with a curing catalyst exemplified by metal salts of an organic acid such as dibutyl tin dilaurate, dioctyl tin dilaurate, dibutyl tin diacetate, tin octoate, iron octoate, zinc octoate and the like. Further, the inventive water-base composition can be admixed, each in a limited amount, with various kinds of known additives including powder materials such as carbon black, fluorocarbon resin powder, melamine resin powder, acrylic resin powder, polycarbonate resin powder, silicone resin powder, which is a different material from silicone rubber powders, nylon resin powder, graphite powder and the like, organic and inorganic pigments, paraffin waxes, polyethylene waxes, silicone oils and so on.

In the following, description is given for several embodiments of the present invention by way of examples as preceded by the description of the preparation procedures of the compounding ingredients used in the examples, in which the values of viscosity are all those obtained by the measurement at 25° C. and the term of "%" in the formulation of the compositions always refers to "% by weight". The water-base organopolysiloxane compositions prepared in the Examples were evaluated by the tests of abrasion resistance and surface smoothness of the coating film formed from the composition on the surface of a rubber article in terms of the coefficient of dynamic friction by the respective testing procedures shown below.

Abrasion resistance

The test specimens for the evaluation of the abrasion resistance of the coating film were prepared in the following manner. Thus, a strip sheet of a foamed EPDM rubber having a length of 150 mm, width of 10 mm, thickness of 2 mm, hardness (JIS A) of 36 and bulk density of 0.63 g/cm$^3$ was coated on one surface with the coating composition under testing by brush coating followed by a heat treatment in a hot-air oven at 150° C. for 2 minutes to give a cured coating film having a thickness of 1 to 3 µm. As is schematically illustrated in FIG. 1, this test specimen 1 was mounted on a table with the coated surface facing upward and the coated surface was rubbed with a 5 mm wide rubbing head 2 of glass, which had a contacting surface roughened with sandpaper #AA80, moved reciprocatingly under conditions of a thrust load of 350 g, rubbing frequency of 60 reciprocations/minute and rubbing stroke of 70 mm and the number of the rubbing reciprocations was recorded when shaving of the rubber surface per se took place.

Surface smoothness

Figure 2:
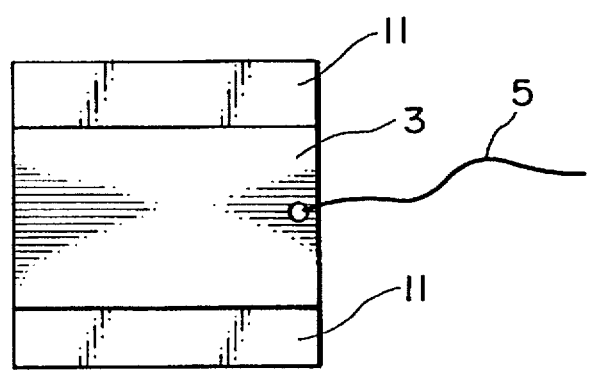
FIG. 2 is a bottom view of the test specimen for the measurement of the coefficient of dynamic friction.
Figure 3:
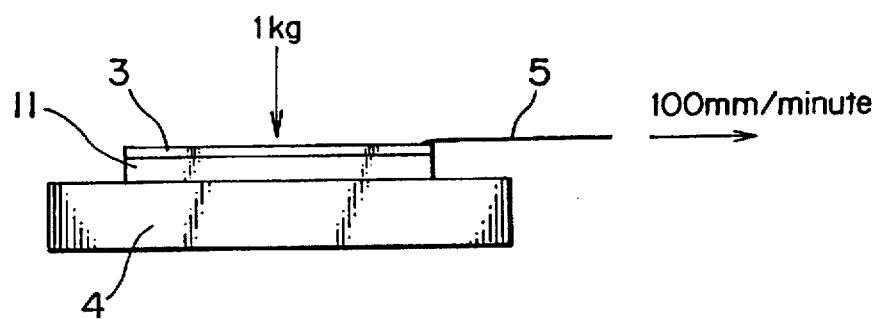
FIG. 3 is a schematic illustration of the method for the determination of the coefficient of dynamic friction.

Test pieces were prepared in the same manner as in the above described test for the abrasion resistance by coating one of the surfaces a piece of the same foamed EPDM rubber having a width of 10 mm, length of 50 mm and thickness of 2 mm with the coating composition under testing. As is illustrated in FIG. 2 showing a bottom view of the test specimen, two test pieces 11,11 were adhesively bonded on the uncoated surface to a 50 mm by 50 mm wide copper plate 3 along the opposite sides. As is illustrated in FIG. 3, the test specimen was mounted on a glass plate 4 with the coated surfaces of the test pieces 11,11 contacting with the glass plate 4 and moved thereon in sliding under a load of 1 kg by pulling with a pulling wire 5 at a velocity of 100 mm per minute to determine the sliding resistance from which the coefficient of dynamic friction µ was calculated.

Preparation 1

An aqueous emulsion of an organopolysiloxane for the component (a), referred to as the emulsion A1 hereinafter, was prepared in the following manner. Thus, 350 g of octamethyl cyclotetrasiloxane and 1.3 g of phenyl triethoxy silane were taken in a glass beaker of 1 liter capacity and, after agitation with a homomixer rotating at 2000 rpm, the mixture in the beaker was admixed with 35 g of a 10% aqueous solution of sodium laurylsulfate and 35 g of a 10% aqueous solution of dodecylbenzene sulfonic acid and further agitated at 6000 rpm so that phase inversion of emulsion took place from the W/O type to an O/W type with an increase in the viscosity. The emulsion was admixed with 280 g of water under continued agitation and then passed through a high-pressure homogenizer under a pressure of 300 kgf/cm$^2$ so that a stable O/W type aqueous emulsion was obtained.

In the next place, the aqueous emulsion was transferred into a glass flask of 1 liter capacity equipped with a stirrer, thermometer and reflux condenser and heated therein at 50° C. for 12 hours followed by standing at 25° C. for 24 hours. Thereafter, the emulsion was neutralized with a 10% aqueous solution of sodium carbonate to give an aqueous emulsion, i.e. emulsion A1, containing an organopolysiloxane terminated at each molecular chain end with a hydroxy group, of which the molar ratio of $Me_2SiO_{2/2}:PhSiO_{3/2}$, in which Me is a methyl group and Ph is a phenyl group, was 1:0.0011.

The emulsion was admixed with isopropyl alcohol to destroy the emulsion and the organopolysiloxane was extracted therefrom and dried to find that the organopolysiloxane per se was a non-flowable gel. The content of the organopolysiloxane in the emulsion A1 was 49% by weight.

Preparation 2

An aqueous emulsion of an organopolysiloxane for the component (a), referred to as the emulsion A2 hereinafter, was prepared in the following manner. Thus, 333 g of octamethyl cyclotetrasiloxane, 14 g of N-(2-aminoethyl)-3-aminopropyl methyl polysiloxane and 3 g of methyl triethoxy silane were taken in a glass beaker of 1 liter capacity and, after agitation with a homomixer rotating at 2000 rpm, the mixture in the beaker was admixed with 30 g of a 30% aqueous solution of cetyl trimethyl ammonium chloride, 3 g of a polyoxyethylene (60 moles addition of ethylene oxide) nonylphenyl ether and 70 g of water and further agitated at 6000 rpm so that phase inversion of emulsion took place with an increase in the viscosity. The emulsion was admixed with 520 g of water under continued agitation and then passed through a high-pressure homogenizer under a pressure of 300 kgf/cm$^2$ so that a stable O/W type aqueous emulsion was obtained.

In the next place, the aqueous emulsion was transferred into a glass flask of 1 liter capacity equipped with a stirrer, thermometer and reflux condenser with addition of 20 g of a 5% aqueous solution of potassium hydroxide and heated therein at 70° C. for 72 hours followed by standing at 25° C. for 24 hours. Thereafter, the emulsion was neutralized with acetic acid to give an aqueous emulsion, i.e. emulsion A2, containing an organopolysiloxane terminated at each molecular chain end with a hydroxy group, of which the molar ratio of $[Me_2SiO_{2/2}+(H_2NC_2H_4NHC_3H_6)_{MeSiO2/2}]$ :MeSiO$_{3/2}$ was 1:0.0037.

The emulsion was admixed with isopropyl alcohol to destroy the emulsion and the organopolysiloxane was extracted therefrom and dried to find that the organopolysiloxane was a non-flowable gel. The content of the organopolysiloxane in the emulsion A2 was 35% by weight.

Preparation 3

An aqueous emulsion of an organopolysiloxane for the component (a), referred to as the emulsion A3 hereinafter, was prepared in the following manner. Thus, 245 g of octamethyl cyclotetrasiloxane, 35 g of a 10% aqueous solution of sodium laurylsulfate and 35 g of a 10% aqueous solution of dodecylbenzene sulfonic acid were taken in a glass beaker of 1 liter capacity and the mixture was agitated by using a homomixer rotating at 6000 rpm so that phase inversion of emulsion took place from the W/O type to an O/W type with an increase in the viscosity. The emulsion was further agitated for 10 minutes. Under continued agitation at 2000 rpm, the emulsion was admixed with 376 g of water and then passed through a high-pressure homogenizer under a pressure of 300 kgf/cm$^2$ so that a stable O/W type aqueous emulsion was obtained.

In the next place, the aqueous emulsion was transferred into a glass flask of 1 liter capacity equipped with a stirrer, thermometer and reflux condenser and heated therein at 50° C. for 12 hours followed by standing at 25° C. for 24 hours. Thereafter, the emulsion was neutralized by the addition of 9 g of a 10% aqueous solution of sodium carbonate to give an aqueous emulsion, i.e. emulsion A3, having a pH of 6.8 and containing an organopolysiloxane terminated at each molecular chain end with a hydroxy group.

The emulsion was admixed with isopropyl alcohol to destroy the emulsion and the organopolysiloxane was extracted therefrom and dried in a hot-air oven kept at 105° C. for 30 minutes. The thus obtained organopolysiloxane had a viscosity of 1,070,000 centistokes at 25° C . The content of the organopolysiloxane in the emulsion A3 was 35% by weight.

Preparation 4

An aqueous emulsion of an organopolysiloxane for the component (a), referred to as the emulsion A4 hereinafter, was prepared in the following manner. Thus, 600 g of a diorganopolysiloxane terminated at each molecular chain end with a hydroxy group having a degree of polymerization of 432 and a viscosity of 5000 centistokes at 25° C., 60 g of a polyoxyethylene (13 moles addition of ethylene oxide) nonylphenyl ether and 100 g of water were taken in a mixing machine (Combimix, manufactured by Tokushu Kika Kogyo Co.) of 3 liters capacity and the mixture was subjected to high-shearing agitation with the anchor-type stirrer blade and the Homodisper rotating at 15 rpm and 1000 rpm, respectively, so that the viscosity of the emulsion was increased followed by further continued agitation for 30 minutes. The emulsion was admixed with 1240 g of water and agitation thereof was continued for additional 30 minutes with the Homodisper and the homomixer rotating at 300 rpm and 2000 rpm, respectively, to give a stable O/W type emulsion, i.e. emulsion A4, of which the content of the organopolysiloxane was 30% by weight.

Preparation 5

An aqueous emulsion for the component (b), referred to as the emulsion B hereinafter, was prepared in the following manner. Thus, 2 g of a 35% hydrochloric acid and 190 g of deionized water were introduced into a glass flask of 1 liter capacity equipped with a stirrer, dropping funnel, thermometer and reflux condenser and 270 g of 3-glycidyloxypropyl methyl diethoxy silane were added dropwise thereinto under agitation over a period of 3 hours. After completion of the dropwise addition of the silane compound, the mixture in the flask was neutralized with propylene oxide and the reaction mixture was freed from ethyl alcohol as a by-product of the reaction by distillation under a reduced pressure with gradual temperature elevation and then kept under a reduced pressure at 100° C. for 30 minutes followed by cooling and release to normal pressure to give a hydrolysis-condensation product of the dialkoxy silane compound.

In the next place, 315 g of the above prepared hydrolysis-condensation product, 30 g of a polyoxyethylene (85 moles addition of ethylene oxide) nonylphenyl ether and 70 g of water were introduced into a glass beaker of 1 liter capacity and the mixture was agitated by using a homomixer rotating at 6000 rpm to find an increase in the viscosity. Under continued agitation as such at 2000 rpm, the emulsion in the beaker was admixed with 285 g of water and then passed through a high-pressure homogenizer under a pressure of 300 kg/cm² to give a stable aqueous emulsion, i.e. emulsion B, which contained 45% by weight of the hydrolysis-condensation product as the effective ingredient.

Preparation 6

An aqueous dispersion of silicone rubber particles for the component (d), referred to as the emulsion D1 hereinafter, was prepared in the following manner. Thus, 280 g of a dimethylpolysiloxane having a viscosity of 10 centistokes at 25° C. and having a degree of polymerization of 12 as terminated at each molecular chain end with a silicon-bonded vinyl group and 90 g of a methyl hydrogen polysiloxane having a viscosity of 200 centistokes at 25° C. as expressed by the formula

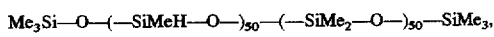

Me₃Si—O—(—SiMeH—O—)₅₀—(—SiMe₂—O—)₅₀—SiMe₃, in which Me is a methyl group, were taken in a glass beaker of 1 liter capacity and, after agitation and mixing by using a homomixer rotating at 2000 rpm, the mixture was admixed with 3 g of a polyoxyethylene (9 moles addition of ethylene oxide) octylphenyl ether and 70 g of water followed by further continued agitation to find phase inversion of the emulsion with an increase in the viscosity. Under further continued agitation as such, the emulsion was admixed with 295 g of water to give an O/W type emulsion.

In the next place, the above obtained emulsion transferred into a glass flask equipped with a stirrer was admixed under agitation with a mixture of 1 g of a toluene solution of a chloroplatinic acid-olefin complex in a concentration of 0.05% as platinum and 1 g of a polyoxyethylene (9 moles addition of ethylene oxide) octylphenyl ether and agitated for 12 hours to effect the hydrosilation reaction so that a stable aqueous emulsion, i.e. emulsion D1, was obtained.

The average particle diameter of the particles in this emulsion was 4 μm as measured by using a Coulter Counter (tradename of Coulter Electronics Inc.). When dried at room temperature, white rubber particles having elasticity were obtained from the emulsion. The content of such a non-volatile constituent in the emulsion D1 was 50% by weight.

Preparation 7

The procedure for the preparation of an aqueous dispersion of silicone rubber particles for the component (d), referred to as the emulsion D2 hereinafter, was substantially the same as in Preparation 6 described above excepting for a decrease of the amount of the polyoxyethylene octylphenyl ether used in the preparation of the O/W type emulsion from 3 g to 0.5 g to obtain a stable aqueous emulsion. The particles in this emulsion had an average particle diameter of 13 μm. White rubber particles having elasticity were obtained by subjecting the aqueous emulsion to air-drying. The content of the solid particles in the emulsion D2 was 50%.

Example 1

A water-base organopolysiloxane composition was prepared by blending 15.7 g of the emulsion A1, 3.69 g of the emulsion B, 1.66 g of triethylenetetramine, referred to as the compound C1 hereinafter, 18.0 g of the emulsion D1 and 61.0 g of water. This formulation of the composition corresponded to the weight ratio of the component (a):component (b):component (c):component (d) of 38.4: 8.3:8.3:45.0 as is shown in Table 1 below.

The organopolysiloxane composition thus prepared was subjected to the evaluation tests for the abrasion resistance and surface smoothness of the coating film thereof formed on the surface of a foamed EPDM rubber sheet in the testing procedures described before to give the results shown in Table 1 below.

Example 2

The experimental procedure was the same as in Example 1 except that the water-base composition was prepared from 18.0 g of the emulsion A1, 2.44 g of the emulsion B, 1.10 g of the compound C1, 18.0 g of the emulsion D1 and 60.5 g of water.

Table 1 below shows the weight proportion of the components (a):(b):(c):(d) and the results of the evaluation tests.

Example 3

The experimental procedure was the same as in Example 1 except that the water-base composition was prepared from 20.2 g of the emulsion A1, 1.24 g of the emulsion B, 0.56 g of the compound C1, 18.0 g of the emulsion D1 and 60.0 g of water.

Table 1 below shows the weight proportion of the components (a):(b):(c):(d) and the results of the evaluation tests.

Example 4

The experimental procedure was the same as in Example 1 except that the water-base composition was prepared from 20.2 g of the emulsion A1, 1.78 g of the emulsion B, 0.32 g of the compound C1, 18.0 g of the emulsion D1 and 59.7 g of water.

Table 1 below shows the weight proportion of the components (a):(b):(c):(d) and the results of the evaluation tests.

Example 5

The experimental procedure was the same as in Example 1 except that the water-base composition was prepared from 20.2 g of the emulsion A1, 2.09 g of the emulsion B, 0.18 g of the compound C1, 18.0 g of the emulsion D1 and 59.5 g of water.

Table 1 below shows the weight proportion of the components (a):(b):(c):(d) and the results of the evaluation tests.

Example 6

The experimental procedure was the same as in Example 1 except that the water-base composition was prepared from 22.0 g of the emulsion A2, 3.69 g of the emulsion B, 1.66 g of the compound C1, 18.0 g of the emulsion D1 and 54.7 g of water.

Table 1 below shows the weight proportion of the components (a):(b):(c):(d) and the results of the evaluation tests.

Example 7

The experimental procedure was the same as in Example 1 except that the water-base composition was prepared from 21.9 g of the emulsion A3, 3.69 g of the emulsion B, 1.66 g of the compound C1, 18.0 g of the emulsion D1 and 54.75 g of water.

Table 1 below shows the weight proportion of the components (a):(b):(c):(d) and the results of the evaluation tests.

Example 8

The experimental procedure was the same as in Example 1 except that the water-base composition was prepared from 15.7 g of the emulsion A1, 4.23 g of the emulsion B, 1.36 g of diethylenetriamine, referred to as the compound C2 hereinafter, 18.0 g of the emulsion D1 and 60.7 g of water.

Table 1 below shows the weight proportion of the components (a):(b):(c):(d) and the results of the evaluation tests.

Example 9

The experimental procedure was the same as in Example 1 except that the water-base composition was prepared from 15.7 g of the emulsion A1, 4.58 g of the emulsion B, 1.24 g of N-aminoethyl piperazine, referred to as the compound C3 hereinafter, 18.0 g of the emulsion D1 and 60.5 g of water.

Table 1 below shows the weight proportion of the components (a):(b):(c):(d) and the results of the evaluation tests.

Example 10

The experimental procedure was the same as in Example 1 except that the water-base composition was prepared from 15.7 g of the emulsion A1, 3.07 g of the emulsion B, 1.92 g of 1,3-phenylene diamine, referred to as the compound C4 hereinafter, 18.0 g of the emulsion D1 and 61.3 g of water.

Table 1 below shows the weight proportion of the components (a):(b):(c):(d) and the results of the evaluation tests.

Example 11

The experimental procedure was the same as in Example 1 except that the water-base composition was prepared from 15.7 g of the emulsion A1, 3.69 g of the emulsion B, 1.66 g of the compound C1, 18.0 g of the emulsion D2 and 61.0 g of water.

Table 1 below shows the weight proportion of the components (a):(b):(c):(d) and the results of the evaluation tests.

Comparative Example 1

The experimental procedure was the same as in Example 1 except that the water-base composition was prepared from 28.5 g of the emulsion A1, 6.67 g of the emulsion B, 3.00 g of the compound C1 and 61.8 g of water with omission of the component (d).

Table 1 below shows the weight proportion of the components (a):(b):(c):(d) and the results of the evaluation tests.

Comparative Example 2

The experimental procedure was the same as in Example 1 except that the water-base composition was prepared from 6.67 g of the emulsion B, 3.00 g of the compound C1, 28.0 g of the emulsion D1 and 62.3 g of water with omission of the component (a).

Table 1 below shows the weight proportion of the components (a):(b):(c):(d) and the results of the evaluation tests.

Comparative Example 3

The experimental procedure was the same as in Example 1 except that the water-base composition was prepared from 15.7 g of the emulsion A1, 3.30 g of the compound C1, 18.0 g of the emulsion D1 and 63.0 g of water with omission of the component (b).

Table 1 below shows the weight proportion of the components (a):(b):(c):(d) and the results of the evaluation tests.

Comparative Example 4

The experimental procedure was the same as in Example 1 except that the water-base composition was prepared from 15.7 g of the emulsion A1, 7.33 g of the emulsion B, 18.0 g of the emulsion D1 and 59.0 g of water with omission of the component (c).

Table 1 below shows the weight proportion of the components (a):(b):(c):(d) and the results of the evaluation tests.

Comparative Example 5

The experimental procedure was the same as in Example 1 except that the water-base composition was prepared from 3.27 g of the emulsion A1, 10.4 g of the emulsion B, 4.70 g of the compound C1, 18.0 g of the emulsion D1 and 63.6 g of water with a too small amount of the component (a).

Table 1 below shows the weight proportion of the components (a):(b):(c):(d) and the results of the evaluation tests.

Comparative Example 6

The experimental procedure was the same as in Example 1 except that the water-base composition was prepared from 37.1 g of the emulsion A1, 1.33 g of the emulsion B, 0.60 g of the compound C1, 12.0 g of the emulsion D1 and 49.0 g of water with a too large amount of the component (a).

Table 1 below shows the weight proportion of the components (a):(b):(c):(d) and the results of the evaluation tests.

Comparative Example 7

The experimental procedure was the same as in Example 1 except that the water-base composition was prepared from 25.6 g of the emulsion A4 instead of A1, 3.69 g of the emulsion B, 1.66 g of the compound C1, 18.0 g of the emulsion D1 and 51.1 g of water.

Table 1 below shows the weight proportion of the components (a):(b):(c):(d) and the results of the evaluation tests.

The composition prepared by the omission of the component (d) as in Comparative Example 1 gives a cured coating film having poor smoothness of the surface while, when the component (a) is omitted, the amount of the component (a) is too small and the amount thereof is too large as in Comparative Examples 2, 5 and 6, respectively, in the formulation of the coating composition, the cured coating film formed from the coating composition is poor in the adhesion to the substrate surface, abrasion resistance and smoothness of the surface. The coating composition without addition of the component (b) or without addition of the component (c) as in Comparative Examples 3 or 4, respectively, gives a cured coating film having tackiness so that such a composition is not suitable for practical applications. When the viscosity of the component (a), which is a diorganopolysiloxane terminated at each molecular chain end with a silanolic hydroxy group, compounded in the coating composition is too low as in Comparative Example 7, the cured coating film also has tackiness so that the composition is not suitable for practical applications.

TABLE 1

| | Weight proportion of components (a):(b):(c):(d) | Times of rubbing | Coefficient of dynamic friction μ |
|---|---|---|---|
| Example | | | |
| 1 | 38.4:8.3:8.3:45.0 | 7000 | 0.5 |
| 2 | 44.0:5.5:5.5:45.0 | 8000 | 0.5 |
| 3 | 49.4:2.8:2.8:45.0 | 8000 | 0.5 |
| 4 | 49.4:4.0:1.6:45.0 | 9000 | 0.5 |
| 5 | 49.4:4.7:0.9:45.0 | 9000 | 0.4 |
| 6 | 38.4:8.3:8.3:45.0 | 5000 | 0.7 |
| 7 | 38.4:8.3:8.3:45.0 | 6000 | 0.4 |
| 8 | 38.5:9.6:6.9:45.0 | 8000 | 0.5 |
| 9 | 38.5:10.3:6.2:45.0 | 6000 | 0.5 |
| 10 | 38.5:6.9:9.6:45.0 | 7000 | 0.5 |
| 11 | 38.4:8.3:8.3:45.0 | 7000 | 0.4 |
| Comparative Example | | | |
| 1 | 70.0:15.0:15.0:0 | 3000 | 1.2 |
| 2 | 0:15.0:15.0:70.0 | 500 | 1.0 |
| 3 | 38.5:0:16.5:45.0 | *) | *) |
| 4 | 38.5:16.5:0:45.0 | *) | *) |
| 5 | 8.0:23.5:23.5:45.0 | 500 | 1.1 |
| 6 | 91.0:3.0:3.0:3.0 | 500 | 1.3 |
| 7 | 38.4:8.3:8.3:45.0 | *) | *) |

*)no tests undertaken due to tackiness of the surface

What is claimed is:

1. An organopolysiloxane composition in the form of a water-base emulsion suitable as a coating agent for the surface of a rubber article, which comprises:

(a) an organopolysiloxane having a viscosity of at least 10000 centipoise at 25° C. and having a molecular structure consisting of the difunctional siloxane units represented by the general unit formula $R^1_2SiO_{2/2}$ and the trifunctional siloxane units represented by the general unit formula $R^2_3SiO_{3/2}$, in which $R^1$ and $R^2$ are each an unsubstituted or substituted monovalent hydrocarbon group having 1 to 20 carbon atoms, in a molar proportion of the trifunctional units to the difunctional units not exceeding 0.01, and terminated at each molecular chain end with a hydroxy group, which is in the form of an aqueous emulsion;

(b) a hydrolysis-condensation product of an epoxy group-containing dialkoxy silane compound represented by the general formula $R^3SiR^4(OR^5)_2$, in which $R^3$ is an epoxy group-containing monovalent organic group having 5 to 20 carbon atoms and $R^4$ and $R^5$ are each a monovalent hydrocarbon group having 1 to 6 carbon atoms and free from an epoxy group, a cohydrolysis-cocondensation product of the above defined epoxy group-containing dialkoxy silane compound and another dialkoxy silane compound free from an epoxy group represented by the general formula $R^6R^7Si(OR^8)_2$, in which $R^6$, $R^7$ and $R^8$ are each a monovalent hydrocarbon group having 1 to 6 carbon atoms free from an epoxy group, or a combination thereof, which is in the form of an aqueous emulsion;

(c) a water-soluble organic amino compound having at least two amino groups in a molecule and containing no silicon atoms; and (d) silicone rubber particles in the form of an aqueous dispersion, in such a weight proportion that the amounts of the components (a), (b), (c) and (d) are in the ranges from 10 to 90% by weight, from 1 to 50% by weight, from 0.1 to 40% by weight and from 1 to 70% by weight, respectively, based on the total amount of the components (a), (b), (c) and (d).

2. The organopolysiloxane composition in the form of a water-base emulsion as claimed in claim 1 in which at least 90% of the groups denoted by $R^1$ are methyl groups.

3. The organopolysiloxane composition in the form of a water-base emulsion as claimed in claim 1 in which the group denoted by $R^2$ is a methyl or phenyl group.

4. The organopolysiloxane composition in the form of a water-base emulsion as claimed in claim 1 in which the organopolysiloxane as the component (a) has a viscosity of at least 100000 centipoise at 25° C.

5. The organopolysiloxane composition in the form of a water-base emulsion as claimed in claim 1 in which the group denoted by $R^3$ is selected from the group consisting of 2-glycidyloxyethyl, 3-glycidyloxypropyl, 2-(3,4-epoxycyclohexyl)ethyl and 3-(3,4-epoxycyclohexyl)propyl groups.

6. The organopolysiloxane composition in the form of a water-base emulsion as claimed in claim 1 in which the epoxy group-containing dialkoxy silane compound is selected from the group consisting of 2-glycidyloxyethyl methyl dimethoxy silane, 2-glycidyloxyethyl methyl diethoxy silane, 3-glycidyloxypropyl methyl dimethoxy silane, 3-glycidyloxypropyl methyl diethoxy silane, 2-(3,4-epoxycyclohexyl)ethyl methyl dimethoxy silane and 2-(3,4-epoxycyclohexyl)ethyl methyl diethoxy silane.

7. The organopolysiloxane composition in the form of a water-base emulsion as claimed in claim 1 in which the water-soluble organic amino compound as the component (c) is selected from the group consisting of ethylenediamine, hexanediamine, diethylenetriamine, triethylenetetramine, 1,8-diamino-4-menthane, N-aminoethyl piperazine, hexamethylenetetramine, 1,3-phenylenediamine and norbornane diamine.

8. The organopolysiloxane composition in the form of a water-base emulsion as claimed in claim 1 in which the silicone rubber particles as the component (d) have an average particle diameter in the range from 0.1 to 100 μm.

9. The organopolysiloxane composition in the form of a water-base emulsion as claimed in claim 1 in which the amounts of the component (a), component (b), component (c) and component (d) are in the ranges of from 20 to 70% by weight, from 2 to 30% by weight, from 0.5 to 20% by weight and from 10 to 60% by weight, respectively, based on the total amount of the components (a) to (d).

10. The organopolysiloxane composition of claim 1, wherein, in organopolysiloxane (a), $R^1$ and $R^2$ are each independently an alkyl, alkenyl, phenyl, tolyl or cycloalkyl group of 1–20 carbon atoms optionally substituted by halogen, epoxy, carboxy or amino groups.

11. The organopolysiloxane composition of claim 1, wherein, in organopolysiloxane (a), the molar proportion of the trifunctional units to the difunctional units does not exceed 0.005.

12. The organopolysiloxane composition of claim 1, wherein the hydrolysis-condensation product or cohydrolysis-cocondensation product has been reacted with trimethylsilyl groups.

13. The organopolysiloxane composition of claim 1, wherein (b) is a cohydrolysis-cocondensation product and the amount of the epoxy group-containing dialkoxy silane compound used to prepare the product is at least 50% by moles.

14. The organopolysiloxane composition of claim 1, wherein the average particle diameter of the silicone rubber particles, (d), is from 1–20 μm.

15. A coated rubber article comprising a rubber article having a coating thereon comprising a cured organopolysiloxane composition according to claim 1.

16. The coated rubber article of claim 15, wherein the coating is provided in a thickness of 0.1 to 10 μm.

* * * * *